United States Patent [19]
Heyder

[11] Patent Number: 5,483,756
[45] Date of Patent: Jan. 16, 1996

[54] CLOTHES DRYER WITH HORIZONTALLY ROTATABLY SUPPORTED DRUM

[75] Inventor: Reinhard Heyder, Berlin, Germany

[73] Assignee: Bosch-Siemens Hausgeraete GmbH, Munich, Germany

[21] Appl. No.: 254,127

[22] Filed: Jun. 6, 1994

[30] Foreign Application Priority Data

Jun. 7, 1993 [DE] Germany .......................... 43 18 897.4

[51] Int. Cl.$^6$ ................................................. F26B 11/00
[52] U.S. Cl. ................................. 34/601; 34/595; 34/602; 34/603; 384/208; 384/209; 384/210
[58] Field of Search ............................ 34/595, 601, 602, 34/603; 384/208, 209, 210

[56] References Cited

U.S. PATENT DOCUMENTS 3,457,656  7/1969  Fox ............................................ 34/601

Primary Examiner—Henry A. Bennet
Assistant Examiner—Siddharth Ohri
Attorney, Agent, or Firm—Herbert L. Lerner; Laurence A. Greenberg

[57] ABSTRACT

A clothes dryer includes a housing, a back wall being joined to the housing, an at least approximately horizontally rotatably supported laundry drum having at least one bottom, and a bearing journal supporting the at least one bottom on the back wall. The bearing journal has a spherical bearing-relevant surface being secured to the back wall. The drum bottom has at least one bearing shell tightly embracing the spherical surface.

10 Claims, 3 Drawing Sheets

CLOTHES DRYER WITH HORIZONTALLY ROTATABLY SUPPORTED DRUM

BACKGROUND OF THE INVENTION

1. Field of the Invention

The invention relates to a clothes dryer with an at least approximately horizontally rotatably supported laundry drum, the drum having at least one bottom being supported through a bearing journal on a back wall being joined to the housing of the dryer.

German Petty Patent DE GM 78 11 868 discloses a clothes dryer having a rearward drum bearing which includes a journal being firmly joined to the drum bottom and a bush being firmly joined to the back wall. As a special feature, the known clothes dryer includes a contact pin penetrating the bearing journal coaxially between a galvanically conductive coating of a cap that covers the bearing point inside the drum and a contact spring secured in insulated fashion to the back wall outside the drum. That feature is intended to enable electrical scanning of damp laundry items inside the drum.

With that bearing technique, a bending moment is absorbed by the rotating back wall of the drum. Therefore, the wall is subject to bending all the way around during operation. The thin sheet metal of the back wall of the drum can accordingly be damaged. In order to ameliorate such bending moments and protect the back wall of the drum against damage, the back walls of the drum have been reinforced with flanges of thick sheet metal. The bearing journal, flange and drum are made of steel and are firmly joined together, so that noises occurring in the bearing are carried through the drum to the outside, undamped.

SUMMARY OF THE INVENTION

It is accordingly an object of the invention to provide a clothes dryer with a horizontally rotatably supported drum, which overcomes the hereinafore-mentioned disadvantages of the heretofore-known devices of this general type and which provides a bearing for the clothes dryer that compensates for a tolerance-dictated difference in height between front and rear bearings in such a way that canting of the rear bearing is no longer possible. It is also an object to avoid resultant noise and strains that cause premature wear as well as to avoid bending all the way around in a back wall of the drum.

With the foregoing and other objects in view there is provided, in accordance with the invention, a clothes dryer, comprising a housing; a back wall being joined to the housing; an at least approximately horizontally rotatably supported laundry drum having at least one bottom; a bearing journal supporting the at least one bottom on the back wall; the bearing journal having a spherical bearing-relevant surface being secured to the back wall; and the drum bottom having at least one bearing shell tightly embracing the spherical surface.

As a result, pendulum motions of the bearing journal all the way around can be compensated for by motions between the spherical surfaces of the bearing journal and the bearing shell, without other forces being able to act on the drum bottom or the back wall. Additional noise and canting that causes wear can also be avoided thereby.

In accordance with another feature of the invention, the drum has a bearing on the side opposite the bottom that also absorbs axial forces from the direction of the spherical shell bearing of the bottom, and the bearing shell of the drum bottom is open so that the spherical surface of the bearing journal can be inserted into the bearing shell without splitting the shell. This makes assembly and maintenance easier.

In the event that the opposite bearing in the drum cannot be constructed as a bearing that absorbs axial forces, a different feature is advantageous. Therefore, in accordance with a further feature of the invention, the bearing shell of the drum bottom has two parts, namely a part oriented toward the bearing journal which forms a spherical annular surface that annularly surrounds the journal and a part disposed inward in the drum, the parts being joined by annular flanges on the two parts. As a result, the drum bearing on the bottom is also suitable for absorbing axial forces, yet nevertheless remains easy to assemble.

In accordance with an added feature of the invention, the connection of the flanges to one another simultaneously includes a connection with the drum bottom which is especially easy to assemble.

In accordance with an additional feature of the invention, the connection is produced by pinlike connecting elements (rivets, screws or the like).

In accordance with yet another feature of the invention, in order to ensure that a drum bearing constructed according to the invention is also suitable for galvanic connection between the bearing parts which are usually made of insulating plastics, and a connecting spring which is mounted on the outside, the connecting elements secure an annular disk to the flange of the part oriented toward the bearing journal, and the disk is in sliding contact with a contact spring being joined to the bearing journal.

In accordance with yet a further feature of the invention, there is provided a contact spring being galvanically connected on one side to the drum bottom and on the other to a contact pin being fastened by means of a spring between a bottom of a coaxial metal blind bore in the journal and a support pan of the contact spring, the contact spring being built into the flange of the part located farther inward in the drum.

In accordance with a concomitant feature of the invention, for galvanic connection of the drum, there is provided a contact pin guide having a spring-loaded contact pin making a galvanic contact with the drum bottom over a circular path outside the flange of the part oriented toward the bearing journal, the contact pin guide being firmly joined to the bearing journal.

The embodiments of the drum bearing according to the invention avoid canting in the bearing. As a result, unnecessary noise production can also be avoided. In addition, a remainder of the bending moment is shifted from the back wall of the drum to the back wall of the appliance. There, however, the bearing moment arises only in the form of a static-action moment and can be absorbed better by the substantially thicker, stiffer back wall of the appliance. The plastic elements used for the bearing additionally avoid noise or damp noise being still produced in the bearing.

Other features which are considered as characteristic for the invention are set forth in the appended claims.

Although the invention is illustrated and described herein as embodied in a clothes dryer with a horizontally rotatably supported drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
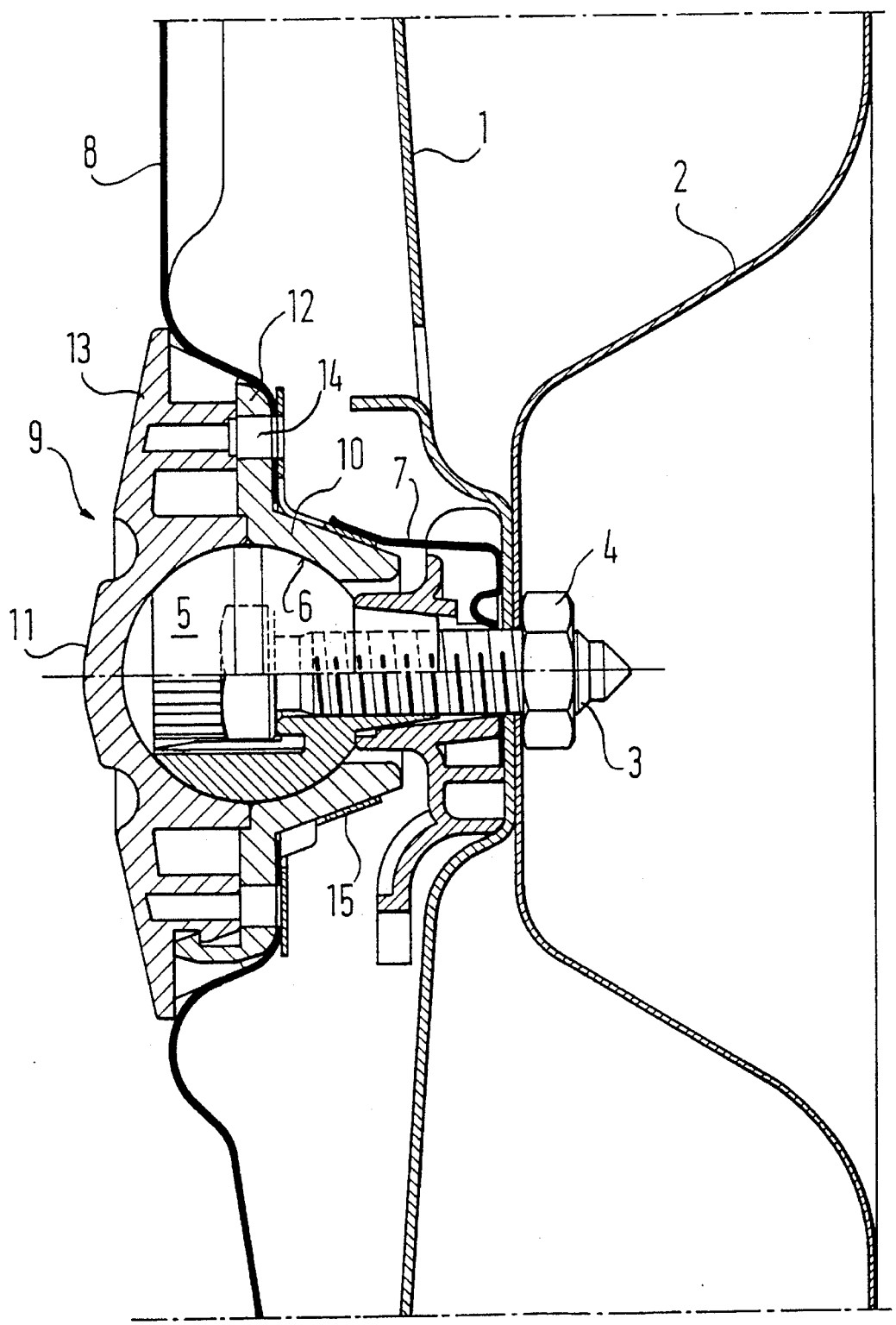
FIGS. 1–3 are fragmentary, diagrammatic, sectional views of bearing regions of three exemplary embodiments of a drum bearing, with a galvanic connection spanning plastic parts of the bearing in each case.

Referring now to the figures of the drawing in detail and first, particularly, to FIG. 1 thereof, there is seen a back wall 1 that is firmly joined to a housing 2 of a clothes dryer in a region of a bearing, by providing that a journal 3 which is intended for the bearing, together with a hexagonal nut 4 thereof, joins together metal sheets of the back wall 1 and the housing 2. Thus the bearing journal 3 is already defined as a stationary bearing journal. The journal 3 has an end facing toward a laundry drum, that has a bearing head 5 which has a spherical surface 6 extending over parts of its outer surface. A contact spring 7 that is in galvanic contact with the metal sheets for the back wall 1 and the housing 2 is also fitted into the fastening of the back wall 1 and the housing sheet 2.

A drum bottom 8 is inverted upward in cuplike fashion in the region of the bearing and receives a two-part bearing shell 9 in an indentation which is thus formed. A part 10 of the bearing shell 9 which is oriented toward the bearing journal 3 forms an inner spherical annular surface that annularly surrounds the spherical head 5 of the journal 3 and corresponds to the spherical surface 6 of the bearing head 3. A part 11 of the bearing shell 9 which is disposed farther inward in the drum covers the cup-shaped indentation of the drum bottom 8 and has a supplementary part of the spherical inner surface that embraces the bearing head 5. The parts 10 and 11 each have a respective annular flange 12 and 13, which are joined to each other and at the same time to the drum bottom 8 by connecting elements 14, that are not shown in further detail. Additionally included in the connection is a cup-shaped slide ring or annular disk 15, which is in constant galvanic contact with the contact spring 7 despite the rotary motion of the slide ring 15 and the drum having the bottom 8.

Figure 2:
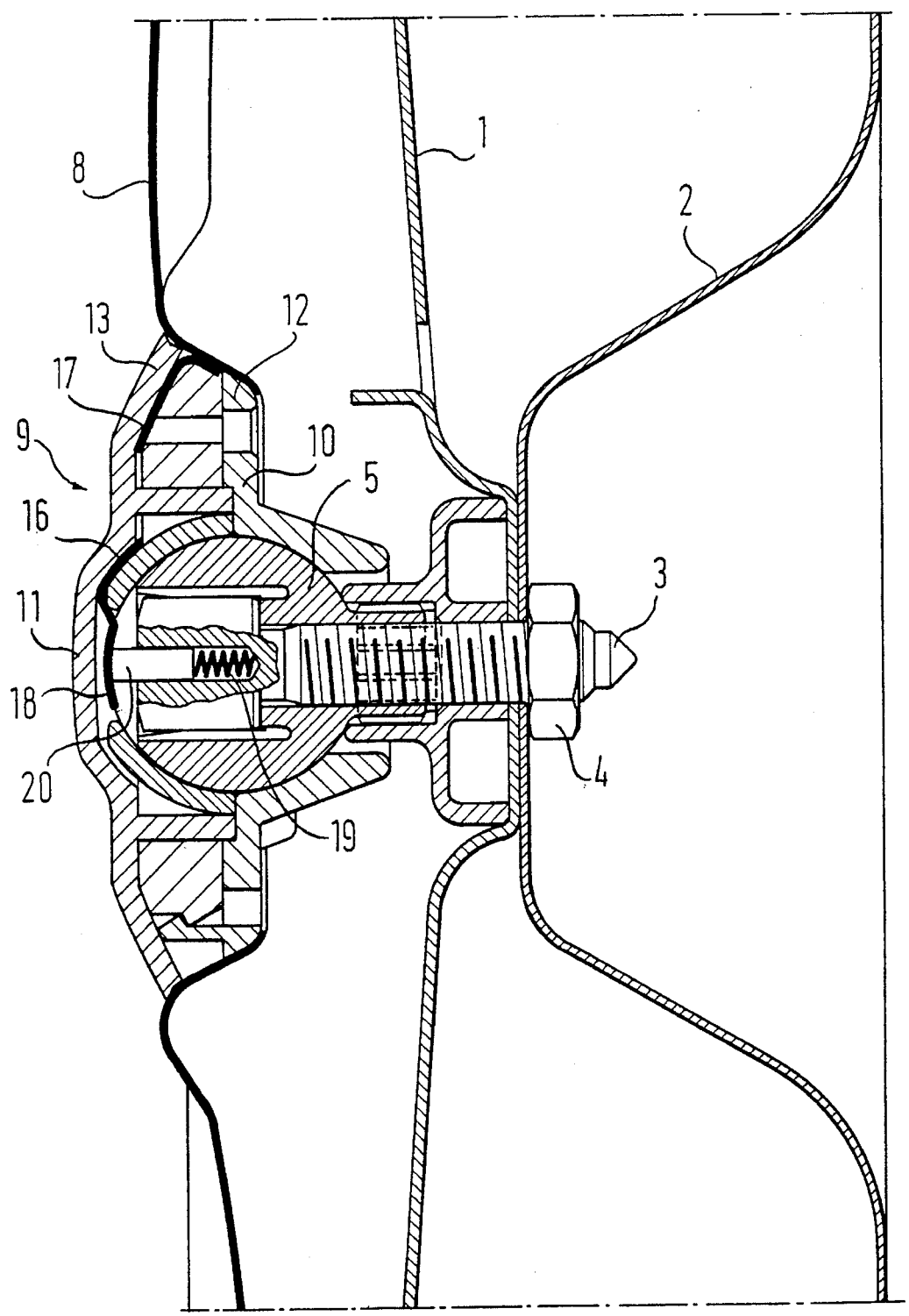

The example shown in FIG. 2 is essentially identical in construction to that of FIG. 1. The only difference is that the part 11 of the bearing shell 9 which is disposed farther inward in the drum is itself also constructed in two parts. A part of the part 11 carrying the flange 13 is shown only as a support part for the spherical bearing shell 16 that is placed in the supporting part. A contact spring 17 is placed between the flange 13 and the spherical bearing shell 16. On one end, below the flange 13, the contact spring 17 is in galvanic contact with the sheet metal of the drum bottom 8, and on its other end it is constructed as a support pan 18. A contact pin 20 is fastened in place between the support pan 18 and a spring 19 that is supported on the bottom of a blind bore disposed coaxially in the bearing journal 3. In the final analysis, this contact pin 20 establishes the galvanic connection of the drum bottom 8 with the journal 3, through the contact spring 17 and the support spring 19. Assembly of the parts of the bearing shell 9 is like that of FIG. 1, except for the additional placement of the spherical bearing shell 16 and the support spring 19.

Figure 3:
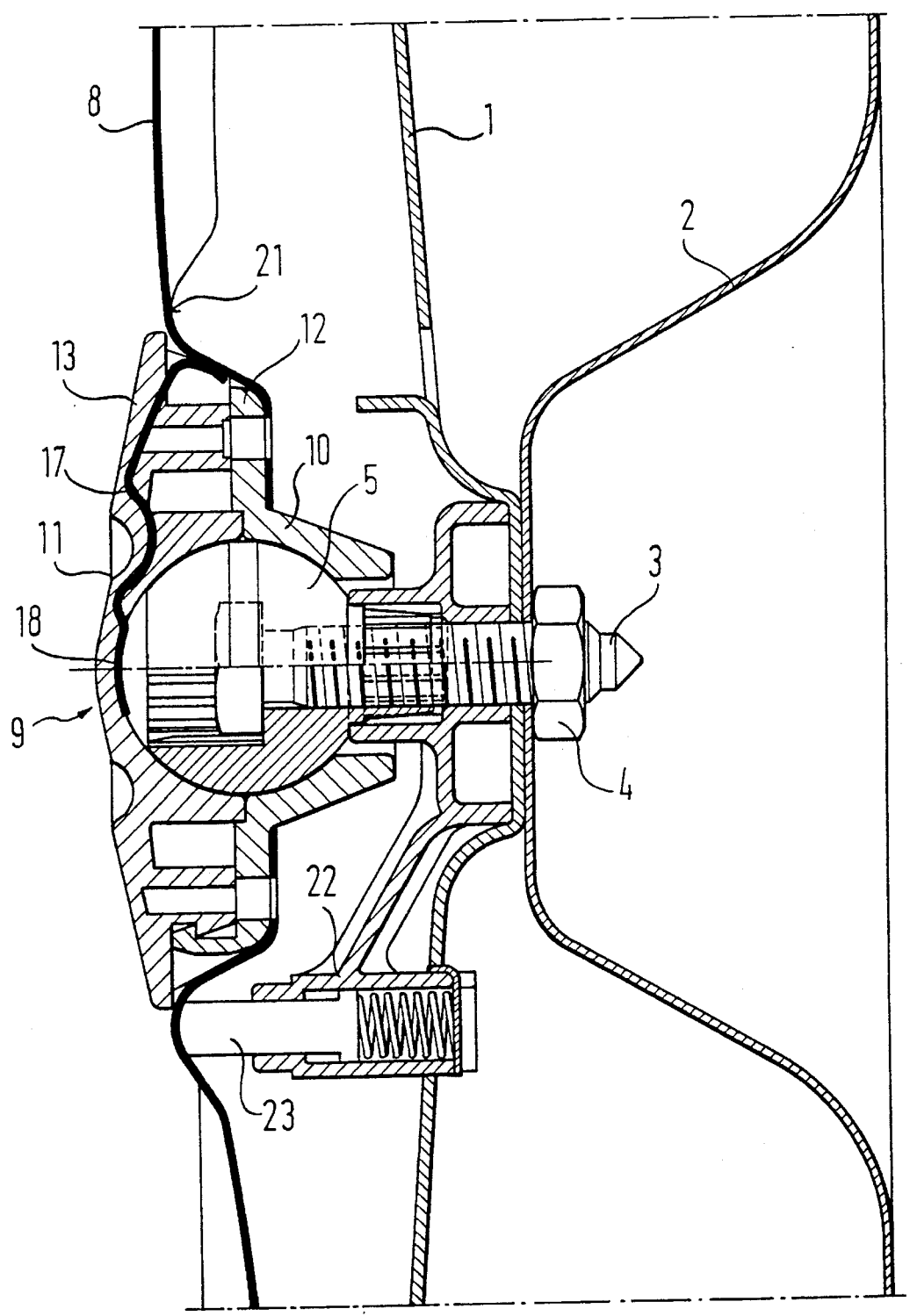

In the exemplary embodiment shown in FIG. 3, two variants are suggested for producing the galvanic connection of the drum bottom 8 and the metal sheets of the housing 2. One variant is based on that shown in FIG. 2 and on one hand includes a contact spring 17 with a support pan or tub 18, both of which are embedded in the part 11 of the bearing shell 9 that is located farther inward in the drum. In the same way as in FIG. 2 (although not shown in FIG. 3), the support pan 18 cooperates with a contact pin 20, in order to establish the galvanic connection with the housing parts.

The other variant for the galvanic connection includes providing that the drum bottom 8 has an annular contact path 21 on an annular line around the cup-shaped indentation in the drum bottom 8. The contact path 21 is in constant galvanic contact with a contact pin 23 that is guided and resiliently supported laterally on a fastening part or contact pin guide 22 of the bearing journal 3.

I claim:

1. A clothes dryer, comprising:

a housing;

a back wall joined to said housing;

an at least approximately horizontally rotatably supported laundry drum having at least one bottom defining a plane;

a bearing journal supporting said at least one bottom on said back wall;

said bearing journal having a spherical bearing-relevant surface stationarily secured to said back wall; and said drum bottom having at least one bearing shell tightly embracing said spherical surface;

wherein said bearing shell and said bearing journal are approximately located in the plane of said bottom.

2. The dryer according to claim 1, which further comprises a bearing absorbing axial forces from a direction of said spherical bearing shell of said bottom.

3. A clothes dryer, comprising:

a housing;

a back wall joined to said housing;

an at least approximately horizontally rotatably supported laundry drum having at least one bottom;

a bearing journal supporting said at least one bottom on said back wall;

said bearing journal having a spherical bearing-relevant surface being secured to said back wall; and said drum bottom having at least one bearing shell tightly embracing said spherical surface;

wherein said bearing shell of said drum bottom has a part being oriented toward said bearing journal and forming a spherical annular surface annularly surrounding said journal and a part disposed inwardly in said drum, said parts having annular flanges thereon joining said parts together.

4. The dryer according to claim 3, wherein said flanges are simultaneously connected to one another and to said drum bottom.

5. The dryer according to claim 3, including pinlike connecting elements joining said flanges to one another.

6. The dryer according to claim 4, including pinlike connecting elements connecting said flanges to one another and to said drum bottom.

7. The dryer according to claim 5, including a contact spring joined to the bearing journal, and an annular disk in sliding contact with said contact spring, said connecting elements securing said annular disk to said flange of said part oriented toward said bearing journal.

8. The dryer according to claim 6, including a contact spring joined to the bearing journal, and an annular disk in sliding contact with said contact spring, said connecting elements securing said annular disk to said flange of said part oriented toward said bearing journal.

9. The dryer according to claim 3, including a contact spring being built into said flange of said part located farther inward in said drum, said contact spring having two sides and a support tub, a contact pin, and a spring fastening said contact pin in place between said support tub and a bottom of a metal blind bore disposed coaxially in said journal, one of said sides of said contact spring being galvanically connected to said drum bottom and the other of said sides being galvanically connected to said contact pin.

10. The dryer according to claim 3, including a contact pin guide being firmly joined to said bearing journal, said contact pin guide having a spring-loaded contact pin in galvanic contact with said drum bottom over a circular path outside said flange of said part oriented toward said bearing journal.

* * * * *